(12) United States Patent
Chen et al.

(10) Patent No.: US 6,678,153 B2
(45) Date of Patent: Jan. 13, 2004

(54) FLAT MONITOR

(75) Inventors: Min-Jye Chen, Miaoli (TW); Ting-Hui Chih, Hualien (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 10/194,082

(22) Filed: Jul. 11, 2002

(65) Prior Publication Data

US 2003/0025063 A1 Feb. 6, 2003

(30) Foreign Application Priority Data

Aug. 1, 2001 (TW) ...................... 90212990 U

(51) Int. Cl.$^7$ ................................ G06F 1/16
(52) U.S. Cl. ................ 361/681; 361/681; 361/683; 248/183.1; 248/183.2; 248/917; 248/921; 364/708.1; 345/905
(58) Field of Search ................ 361/681, 682, 361/683; 381/87–86, 306, 309, 333, 386; 248/917–919, 922, 122.1, 183.2, 183.1, 186.2, 371, 923, 349.1; 364/708.1; 345/905; 267/64.12; 312/7.2, 223.1, 223.2; D14/300–461

(56) References Cited

U.S. PATENT DOCUMENTS 6,288,891 B1 * 9/2001 Hasegawa et al. .......... 361/681
6,510,049 B2 * 1/2003 Rosen ........................ 361/681

FOREIGN PATENT DOCUMENTS

JP 411331735 A * 11/1999 ............ H04N/5/64

* cited by examiner

Primary Examiner—Michael Datskovsky
(74) Attorney, Agent, or Firm—Ladas & Parry

(57) ABSTRACT

A flat monitor. The flat monitor comprises a supporting mechanism. The supporting mechanism comprises a base having a receiving space, a first linking shaft having a first end connected to the base and a second end, and a second linking shaft having a third end and a fourth end. The third end is movably connected to the base and moves between a first position and a second position. The fourth end is pivoted to the second end of the first linking shaft so as to form a joint portion. A deceleration device is disposed between the first linking shaft and the base in order to slow the speed at which the joint portion moves between a supporting position and a receiving position.

18 Claims, 3 Drawing Sheets

1

FLAT MONITOR

BACKGROUND OF THE INVENTION

1. Field of the Invention

The present invention relates to a monitor casing, and in particular to a monitor casing having a foldable supporting mechanism.

2. Description of the Related Art

Generally speaking, the pedestal of a conventional flat monitor, such as a LCD monitor, is mounted to its outer casing by a detachable manner. The position of the pedestal is adjusted such that the view angle of the flat monitor can be changed.

However, as the pedestal is not foldable, it is inconvenient to package or carry the flat monitor.

Consequently, an object of the invention is to improve the conventional flat monitor structure so as to provide a better flat monitor.

SUMMARY OF THE INVENTION

An object of the invention is to provide a flat monitor having a foldable supporting mechanism. The supporting mechanism comprises a base having a receiving space; a first linking shaft having a first end connected to the base and a second end; and a second linking shaft having a third end and a fourth end, the third end movably connected to the base and moving between a first position and a second position, and the fourth end pivoted to the second end of the first linking shaft so as to form a joint portion.

When the third end is located at the first position in the base, the joint portion is located at a supporting position such that the supporting mechanism can support the flat monitor on a surface.

When the third end is located at the second position in the base, the joint portion is located at a receiving position such that the first linking shaft and the second linking shaft are accommodated in the receiving space.

A detailed description will be given by the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1C:
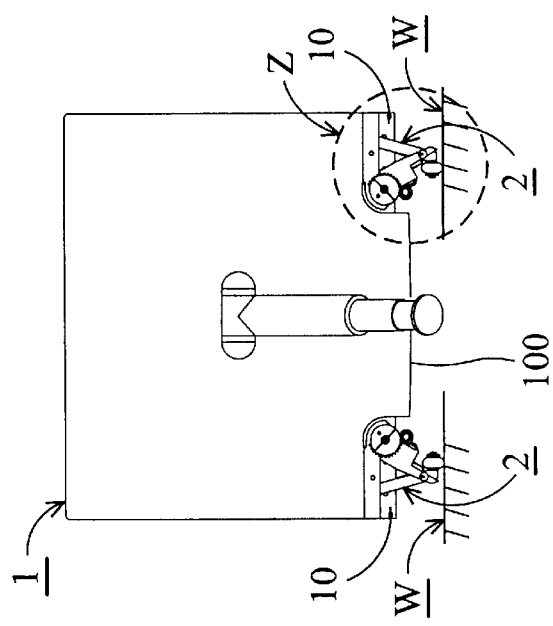
FIG. 1C is a rear elevation view of the flat monitor of the invention.
Figure 1B:
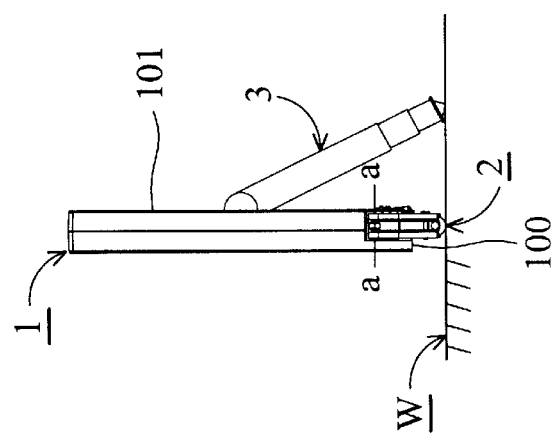
FIG. 1B is a right elevation view of the flat monitor of the invention.
Figure 1A:
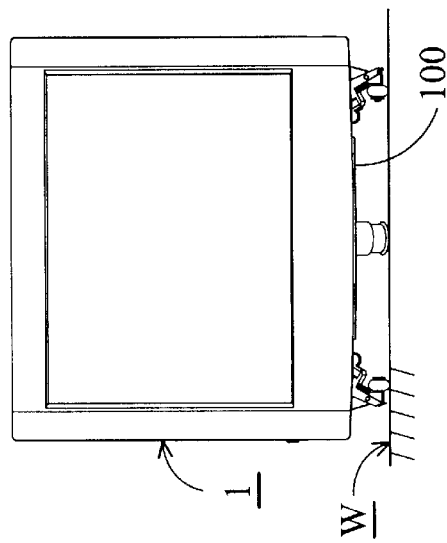
FIG. 1A is a front elevation view of the flat monitor of the invention.

Referring to FIG. 1A, FIG. 1B, FIG. 1C, FIG. 2A and FIG. 2B, the monitor 1 comprises two foldable supporting mechanisms 2, a supporting arm 3 and two deceleration devices 150. The two foldable supporting mechanisms 2 are disposed on two ends of the bottom 100 of the monitor 1, respectively. The supporting arm 3 is adjustable and connected to the back 101 of the flat monitor 1. The deceleration devices 150 are respectively connected with the foldable supporting mechanisms 2 in order to control the moving speed of the foldable supporting mechanisms 2.

Referring to FIG. 2A, FIG. 2B, FIG. 3A and FIG. 3B, the flat monitor 1 has a receiving portion 10, and the foldable supporting mechanism 2 has a base 20, a linking shaft assembly 120, a supporting element 130 and a guiding element 140.

The base 20 is disposed in the receiving portion 10 and having a guiding groove 200 and a receiving space 201. The linking shaft assembly 120 includes a first linking shaft 121 and a second linking shaft 122. The first linking shaft 121 has a first end 1211 and a second end 1212 while the second linking shaft 122 has a third end 1221 and a fourth end 1222. The first end 1211 of the first linking shaft 121 is pivoted to the base 20 around an axis a-a while the second end 1212 of the first linking shaft 121 is pivoted to the fourth end 1222 of the second linking shaft 122 around an axis b-b so as to form a joint portion 124.

The guiding element 140 is disposed on the third end 1221 of the second linking shaft 122 and movably disposed in the guiding groove 200. The third end 1221 of the second linking shaft 122 slides in the guiding groove 200 by the guiding element 140. A barricade 208 is used to constrain the third end 1221 of the second linking shaft 122 to move between a first position 204 and a second position 206 in the base 20. In this embodiment, the guiding element 140 is a roller.

When the third end 1221 of the second linking shaft 122 is located at the first position 204, the joint portion 124 is located at a supporting position I such that the foldable supporting mechanism 2 can support the monitor 1 on a surface W.

On the other hand, when the third end 1221 of the second linking shaft 122 is located at the second position 206, the joint portion 124 is located at a receiving position II such that the first linking shaft 121 and the second linking shaft 122 can retract into the receiving space 201.

A resilient element 172 is interposed between the first linking shaft 121 and the second linking shaft 122 in order to provide a resilient force to release the linking shaft assembly 120 from the base 20. Thus, the joint portion 124 can be released from the receiving space 201.

The monitor 1 can slide on the surface W by the supporting element 130 disposed on the joint portion 124, wherein the supporting element 130 can be a roller.

The deceleration device 150 is disposed between the first end 1211 of the first linking shaft 121 and the base 20. The deceleration device 150 includes a first gear 151 and a second gear 152. The first gear 151 is mounted in the monitor 1 such that it cannot move and rotate with respect to the monitor 1. The second gear 152 is pivoted to the first linking shaft 121 around an axis c-c and engaged with the first gear 151. Thus, the speed at which the supporting element 130 moves from the supporting position I to the receiving position II can be reduced. The moving speed of the joint portion 124 can be reduced as well. In this embodiment, the first gear 151 and the second gear 152 can also be ratchets.

Figures 2A, 2B:
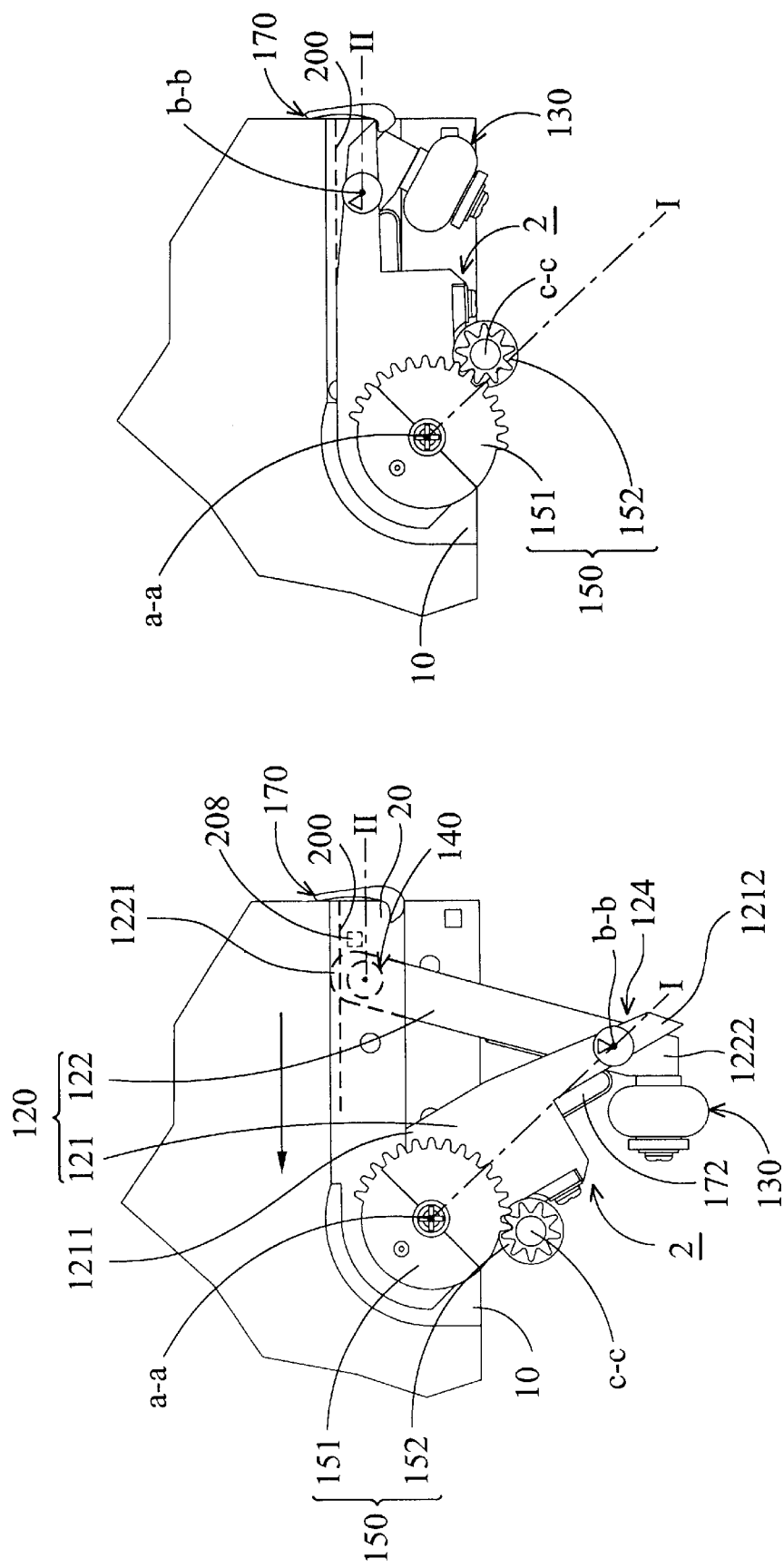
FIG. 2A is an enlarged view of the area Z in FIG. 1C.
FIG. 2B shows another enlarged view of the area Z according to FIG. 2A.

As shown in FIG. 2A, when the supporting element 130 moves from the supporting position I to the receiving position II, the guiding element 140 moves along the direction indicated by an arrow so that the second linking shaft 122 retracts gradually to the receiving space 201.

Simultaneously, the first linking shaft 121 retracts gradually to the receiving space 201 due to the movement of the second linking shaft 122 pivoted thereto. Then, a holding element 170, as shown in FIG. 2B, can keep the supporting element 130 in the receiving space 201.

On the other hand, when the supporting element 130 is to move from the receiving position II to the supporting position I, the resilient element 172 interposed between the first linking shaft 121 and the second linking shaft 122 can provide a resilient force to release the supporting element 130 from the receiving space 201 by pressing the holding element 170. Then, the position of the supporting element 130 can be adjusted to meet a user's demand.

Figure 3B:
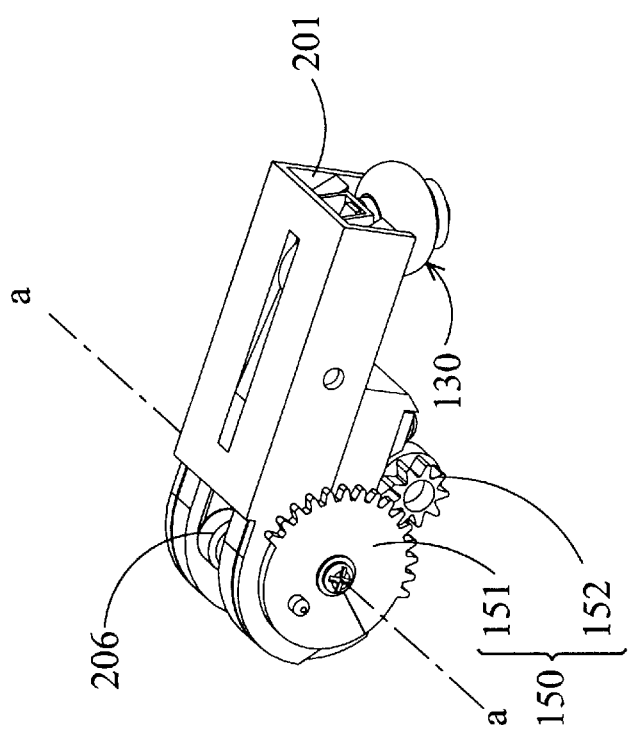
FIG. 3B is another perspective view of the foldable supporting mechanism (2) of the flat monitor according to FIG. 2B.
Figure 3A:
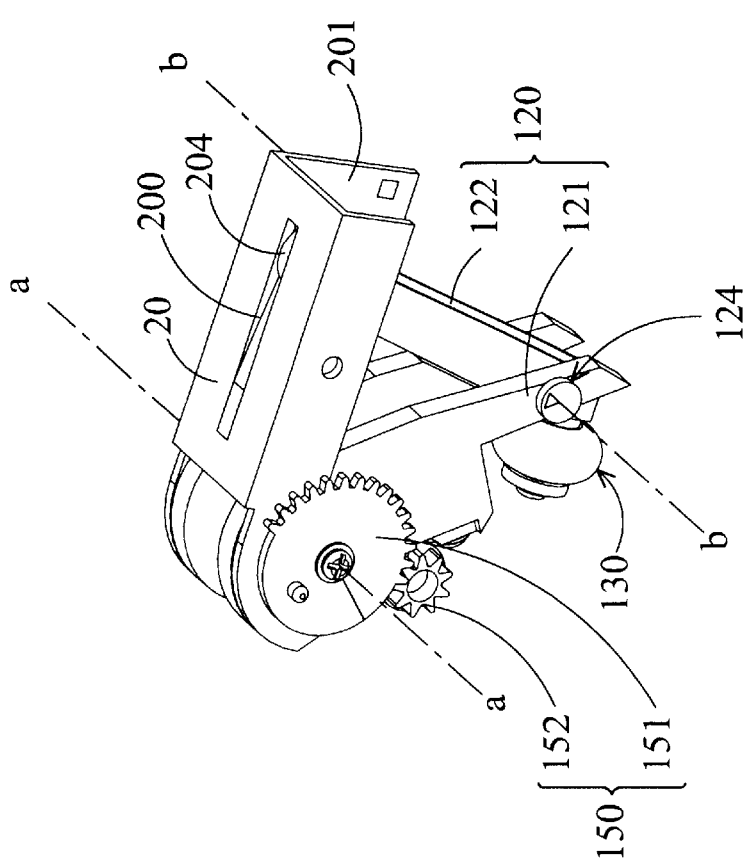
FIG. 3A is a perspective view of the foldable supporting mechanism (2) of the flat monitor according to FIG. 2A.

As shown in FIG. 2B and FIG. 3B, when the foldable supporting mechanism 2 is completely accommodated in the receiving portion 10, the size of the monitor 1 is smaller, so that it is easier to package or carry the monitor 1.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A flat monitor, comprising:
    a casing having a front panel and a back;
    a supporting arm connected to the back of the flat monitor; and
    a supporting mechanism disposed on the back of the flat monitor and moved between a supporting position and a receiving position, the supporting mechanism having a first linking shaft and a second linking shaft, the first linking shaft having a first end and a second end, the second linking shaft having a third end and a fourth end, wherein the first end of the first linking shaft is pivoted to the back and the second end of the first linking shaft is pivoted to the fourth end of the second linking shaft so as to form a joint portion,
    whereby, when the flat monitor is supported on a surface by the supporting arm and the supporting mechanism, the supporting mechanism is located at the supporting position,
    whereby, when the supporting mechanism is moved from the supporting position to the receiving position, the supporting mechanism is received in the back of the flat monitor.

2. The flat monitor as claimed in claim 1, wherein the casing further comprises a receiving portion for accommodating the supporting mechanism.

3. The flat monitor as claimed in claim 2, wherein the supporting mechanism further comprises a base disposed in the receiving portion.

4. The flat monitor as claimed in claim 3, wherein the base further comprises a guiding groove, the first end of the first linking shaft connected to the back of the flat monitor through the base, the third end of the second linking shaft movably connected to the guiding groove.

5. The flat monitor as claimed in claim 4, wherein the supporting mechanism further comprises a supporting element disposed on the joint portion and moved according to the moving of the supporting mechanism, whereby, the supporting element supports the flat monitor on the surface when the supporting mechanism is located at the supporting position, and the supporting element is accommodated in the casing of the flat monitor when the supporting mechanism is located at the receiving position.

6. The flat monitor as claimed in claim 5, wherein the supporting element is a roller.

7. The flat monitor as claimed in claim 4, wherein the supporting mechanism further comprises a guiding element disposed on the third end of the second linking shaft, whereby the third end slides in the guiding groove by the guiding element.

8. The flat monitor as claimed in claim 3, wherein the base further comprises a receiving space for accommodating the first linking shaft, the second linking shaft and the supporting element.

9. The flat monitor as claimed in claim 3, wherein the supporting mechanism further comprises a deceleration device disposed between the fist linking shaft and the base.

10. The flat monitor as claimed in claim 9, wherein the deceleration device further comprises a first gear and a second gear engaged therewith.

11. A supporting mechanism for a flat monitor, comprising:
    a base having a receiving space;
    a first linking shaft having a first end connected to the base and a second end; and
    a second linking shaft having a third end and a fourth end, the third end movably connected to the base and moving between a first position and a second position, and the fourth end pivoted to the second end of the first linking shaft so as to form a joint portion;
    whereby, when the third end is located at the first position in the base, the joint portion is located at a supporting position such that the supporting mechanism can support the flat monitor on a surface;
    whereby, when the third end is located at the second position in the base, the joint portion is located at a receiving position such that the first linking shaft and the second linking shaft are accommodated in the receiving space.

12. The supporting mechanism as claimed in claim 11, further comprising a resilient element interposed between the first linking shaft and the second linking shaft in order to provide a resilient force to release the joint portion from the receiving space.

13. The supporting mechanism as claimed in claim 11, wherein the base further comprises a guiding groove, the third end movably connected to the base by the guiding groove.

14. The supporting mechanism as claimed in claim 11, wherein the joint portion further comprises a supporting element for supporting the flat monitor on the surface.

15. The supporting mechanism as claimed in claim 12, further comprising a deceleration device disposed between the first linking shaft and the base in order to slow the speed at which the joint portion moves between the supporting position and the receiving position.

16. The supporting mechanism as claimed in claim 15, wherein the deceleration device further comprises a first gear and a second gear, the first gear engaged with the second gear, the first gear mounted on the base and the second gear pivoted to the first linking shaft.

17. The supporting mechanism as claimed in claim 13, wherein the second linking shaft further comprises a guiding element disposed on the third end, whereby the third end slides in the guiding groove by the guiding element.

18. The supporting mechanism as claimed in claim 14, wherein the supporting element is a roller.

* * * * *